United States Patent [19]
Hopson

[11] Patent Number: 5,881,769
[45] Date of Patent: Mar. 16, 1999

[54] BREAKAWAY COUPLING

[75] Inventor: Douglas F. Hopson, Union City, Pa.

[73] Assignee: Snap-Tite Technologies, Inc., Union City, Pa.

[21] Appl. No.: 575,099

[22] Filed: Dec. 19, 1995

[51] Int. Cl.[6] .................................................. F16L 37/28
[52] U.S. Cl. ................................ 137/614.2; 137/614.05; 285/1
[58] Field of Search ........................... 137/614.2, 614.04, 137/614.05, 614.03, 513.3; 285/1, 2

[56] References Cited

U.S. PATENT DOCUMENTS

| | | | |
|---|---|---|---|
| 2,833,301 | 5/1958 | Argus ................................ | 137/614.2 X |
| 4,682,795 | 7/1987 | Rabushka et al. ......................... | 285/1 |
| 4,774,983 | 10/1988 | Abe ..................................... | 137/614.2 |
| 4,798,337 | 1/1989 | Shimokawa ........................ | 137/614.2 X |
| 4,896,688 | 1/1990 | Richards et al. ............... | 137/614.04 X |
| 4,906,031 | 3/1990 | Vyse .......................................... | 285/318 |
| 5,168,897 | 12/1992 | Vanderjagt ........................ | 137/614.2 X |
| 5,323,812 | 6/1994 | Wayne ................................ | 137/614.05 |
| 5,433,247 | 7/1995 | Guertin ............................... | 137/614.04 |

*Primary Examiner*—Kevin Lee
*Attorney, Agent, or Firm*—Woodling, Krost & Rust

[57] ABSTRACT

A breakaway coupling comprising a nipple and coupler normally engaged together by a canted coil spring. The coupler includes a coupler valve and the nipple includes a check valve. The canted coil spring is disposed in the coupler and receives the nipple as it enters the coupler. The nipple includes an inclined surface which enables the canted coil spring to be gradually compressed as the nipple enters the coupler. The canted coil spring simultaneously engages the shoulders and bottom surface of a recess in the coupler body and the first and second beveled surfaces and the bottom surface of a recess in the nipple adaptor. Vent structure is provided in the coupler and a bleed back vent is provided in the nipple.

8 Claims, 12 Drawing Sheets

BREAKAWAY COUPLING

FIELD OF THE INVENTION

This invention is a breakaway coupling which employs a canted coil spring to prevent separation of the nipple portion from the coupler portion. The breakaway coupling is used in applications such as dispensing natural gas to a vehicle. The breakaway coupling is situated in series between a pump dispenser and a nozzle. The nozzle is used to fuel the gas tank of an individual automobile. The breakaway coupling serves as a means to disconnect the hose which links the breakaway coupling and the nozzle. The breakaway coupling separates in the event that a person does not release the nozzle from an individual automobile prior to driving away from the pump station.

BACKGROUND OF THE INVENTION

Breakaway couplings of various types are known. Typically, couplings employ detents, shear pins, and springs to fasten the nipple and coupler together. U.S. Pat. No. 4,906,031 to Vyse employs a garter spring situated in a groove in the female member which then engages an arcuate surface on the male member when the male and female members are coupled together. Specifically, Vyse discloses a garter spring located on surfaces which are designed so as to maintain the shape of the garter spring. The garter spring of Vyse is cylindrical. U.S. Pat. No. 4,896,688 to Richards et al. discloses a spring situated in a groove on the male member which expands radially outwardly to engage the female member and secure the male and female members together. U.S. Pat. No. 4,682,795 to Rabushka et al. discloses a spring which wraps around the male and female members to fasten them together under the tension of the spring.

The novelty of the present invention is directed toward the use of a canted coil spring which resides in the female half, otherwise referred to herein as the coupler, and which engages and maintains the nipple in position when the coupler and the nipple are joined. Additionally, the present invention also employs a check valve within the nipple which includes a bleed port. Similarly, with respect to the coupler, a vent passageway is also supplied which allows gas under pressure to escape to the exterior of the breakaway coupling. The venting means of the coupler is necessary because the seals leak. The venting means of the check valve is necessary to permit the breakaway coupling and downstream hose to vent so that the nozzle may be disconnected from the vehicle when the fueling operation has been completed.

SUMMARY OF THE INVENTION

This invention comprises a breakaway coupling which employs a canted coil spring. The canted coil spring is oblong when viewed in cross section. Further, the canted coil spring is manufactured such that the coils of the spring are angled when viewed from above. The canted coil spring used in the present invention resides in the coupler. The canted coil spring can be used with or without a snap ring to secure the canted coil spring in the coupler.

The coupler and nipple are pressure balanced. The pressure balanced feature of the present invention enables the nipple and the coupler to be joined together without a separation force therebetween. A first passageway through the coupler communicates with ports in the second adaptor of the nipple which communicate with a second passageway through the nipple. The second adaptor of the nipple has surfaces thereon which guide the coiled canted spring into a second recess of the second adaptor of the nipple. Additionally, the second recess of the second adaptor of the nipple includes surfaces which restrain any movement of the nipple with respect to the first body of the coupler.

The nipple includes a second adaptor which has a face thereon. The face of the nipple adaptor, also known as the second adaptor, includes a beveled edge thereon. The beveled edge of the second adaptor engages the snap ring situated on the coupler valve of the coupler. The second adaptor of the nipple maintains the coupler valve in an open position against the resistance of a spring situated between the coupler valve and the first adaptor of the coupler. Thus, flow is permitted between the coupler and the nipple when the coupler and nipple are engaged and the coupler valve is open.

The nipple further includes a check valve. Ports exist in the check valve to permit the bleed back of the natural gas (or other fluid being used) through the port and toward the pressure source after the fueling operation has been completed. The bleed back occurs after the pressure source has been isolated. This enables the disconnection of the nozzle which is used to fuel the automobile or other vehicle.

The coupler includes a vent passageway between the interior and the exterior of the adaptor of the coupler. The adaptor of the coupler is sometimes referred to herein as the first adaptor of the coupler. This enables gas which leaks around the seals to escape when the coupler and nipple are engaged together. The coupler and nipple of the breakaway coupling are normally engaged.

It is an object of the present invention to provide a breakaway coupling which includes a canted coil spring which is disposed in a first recess of the coupler body and which engages a second recess in the second adaptor of the nipple thus preventing separation of the coupler and the nipple.

It is a further object of the present invention to provide a breakaway coupling which includes a check valve with bleed back ports in the nipple. The bleed back ports in the check valve of the nipple enable disconnection of the nozzle which is used to fuel an automobile or other vehicle.

It is a further object of the present invention to provide a coupler which includes a coupler valve maintained in the open position by the second adaptor of the nipple. The second adaptor of the nipple includes a face having a beveled edge thereon. The beveled edge of the face of the second adaptor of the nipple engages a snap ring which is situated in a groove in the coupler valve. The engagement of the snap ring of the coupler valve by the second adaptor of the nipple maintains the coupler valve in an open position.

It is a further object of the present invention to provide a breakaway coupling which is pressure balanced.

It is a further object of the present invention to provide a coupler having a vent passageway. The vent passageway leads from the interior of the first adaptor of the coupler to the exterior of the first adaptor of the coupler. The vent passageway permits gas to escape which has leaked around the seals of the breakaway coupling while it is engaged and pressurized.

It is a further object of the present invention to provide a canted coil spring which includes a snap ring within the canted coil spring which maintains the canted coil spring in position within the first recess of the first body of the coupler.

Other objects, uses and advantages of this invention are apparent from reading the brief description of the drawings, the description of the preferred embodiment and the claims which follow.

BRIEF DESCRIPTION OF THE DRAWINGS

FIG. 2 is a quarter sectional view of the preferred embodiment of the nipple 29 of the breakaway coupling. FIG. 2 illustrates check valve 15 with bleed ports 31 therein;

FIG. 3 is a quarter sectional view of the coupler 30 of the breakaway coupling. FIG. 3 illustrates the canted coil spring 1 together with snap ring 21;

FIG. 5 is a quarter sectional view of the nipple and coupler of the breakaway coupling 28 engaged together. FIG. 5 illustrates the preferred embodiment of the present invention. FIG. 5 is identical to FIG. 1 with the exception that the snap ring 2 is not included in the preferred embodiment. FIG. 5 also illustrates bleed ports 31 in the check valve 15 of the nipple;

FIG. 6 is a quarter sectional view of the coupler 30 of the preferred embodiment. FIG. 6 is identical to FIG. 2 with the exception that the snap ring 2 is not included in the preferred embodiment;

FIG. 7 illustrates the preferred embodiment;

FIG. 8 is a quarter sectional view of the breakaway coupling similar to that illustrated in FIG. 5. Reference numeral 25 indicates the application of pressure to the coupler. FIG. 8 illustrates the check valve 15 in the open position;

DESCRIPTION OF THE PREFERRED EMBODIMENT

Figure 5:
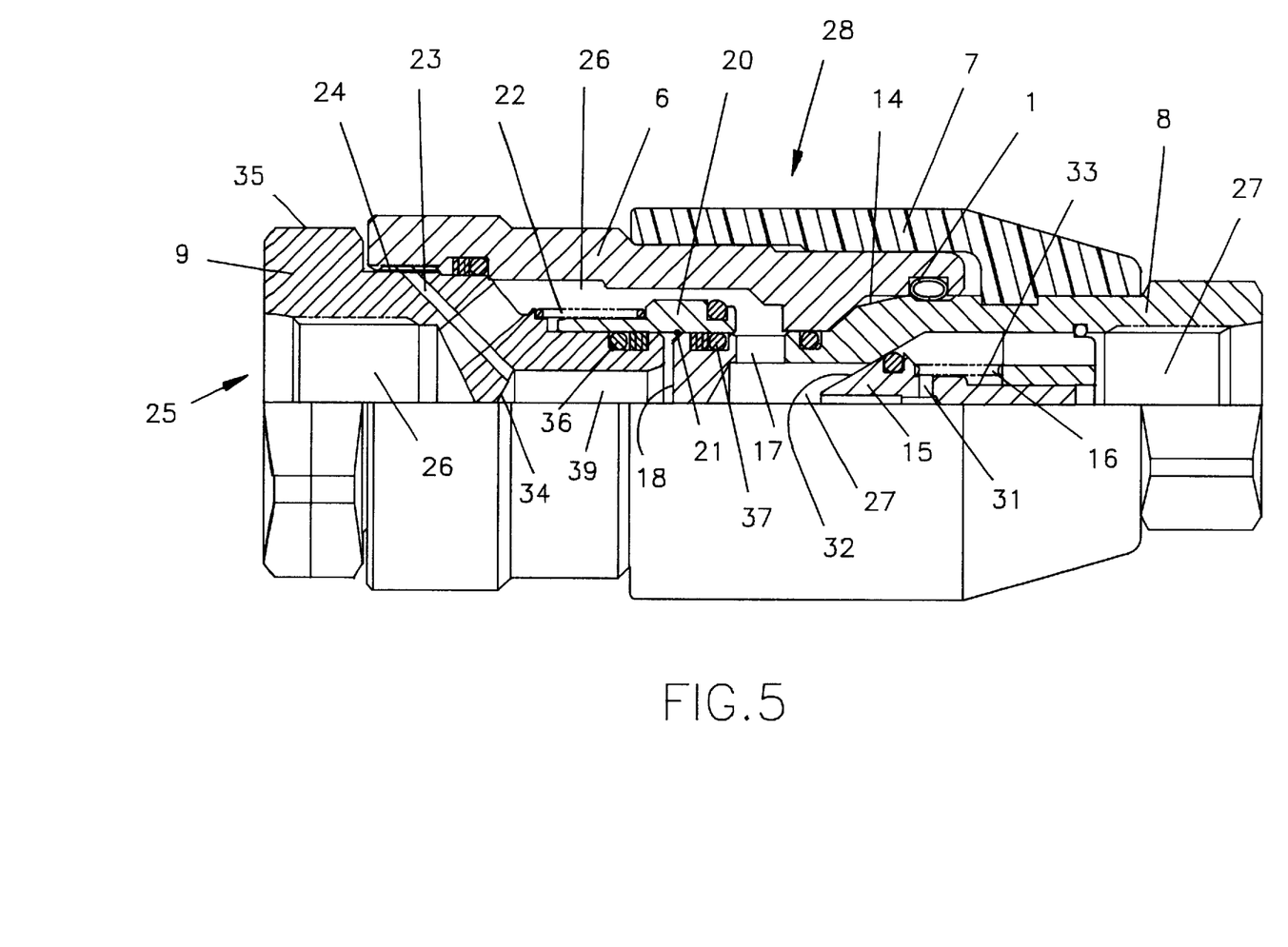

FIG. 5 illustrates the preferred embodiment of the present invention. FIG. 5 illustrates the coupler which includes the first adaptor 9, the first body 6, and the coupler valve 20. The coupler body 6 is affixed to the coupler adaptor 9 by means of threads. Reference numeral 24 indicates the threads which affix the coupler body 6 to the coupler adaptor 9. Spring 22 urges coupler valve 20 toward a closed position. FIG. 5 illustrates coupler valve 20 in the open position.

FIG. 5 also illustrates the nipple. The nipple is comprised of a second adaptor 8, a second body 7, and a check valve 15. Second body 7 is made of a plastic. The plastic is snapped over the second adaptor 8 of the nipple during assembly. Check valve 15 includes bleed back ports 31 for relieving pressure after the fueling operation is completed.

In the normal state the breakaway coupling illustrated in FIG. 5 is connected to a dispensing pump and to a nozzle. In particular, the first adaptor 9 of the coupler is connected to a hose or other conduit which leads to a supply pressure source which is not shown. Similarly the second adaptor 8 is connected to a hose or other conduit which leads to a nozzle which fuels a vehicle. The nozzle is not shown in FIG. 5. The nozzle typically used in the natural gas industry locks onto the vehicles. Some nozzles can not be released from the vehicles until pressure is removed from the nozzle.

Pressure is bled from the nozzle back through second passageway 27, through bleed back port 31, and through port 17 into the first passageway 26 of the coupler and finally out of the coupler into a reservoir or into an evacuated supply line.

FIG. 5 further illustrates spring 16 which biases check valve 15 to the closed position. The second adaptor 8 includes a face 18. Beveled edge 19 engages snap ring 21. Snap ring 21 resides in a groove in the coupler valve 20. Snap ring 21 engages beveled edge 19 of the second adaptor 8 of the nipple which maintains coupler valve 20 in the open position. Spring 22 biases the snap ring 21 in the groove of the coupler valve 20 against the face of the nipple adaptor 8.

FIG. 5 also illustrates vent passageway 23 leading from the interior of the first adaptor of the coupler 34 to the exterior 35 thereof. Vent passageway 23 vents natural gas which has leaked by seals 36 on the first adaptor of the coupler or seals 37 on the second adaptor of the nipple. The leaking gas enters chamber 39 of the interior of the first adaptor 9. This gas is then vented through vent passageway 23 which leads to the threaded interconnection 24 of the coupler body 6 and the first adaptor 9.

Figure 6:
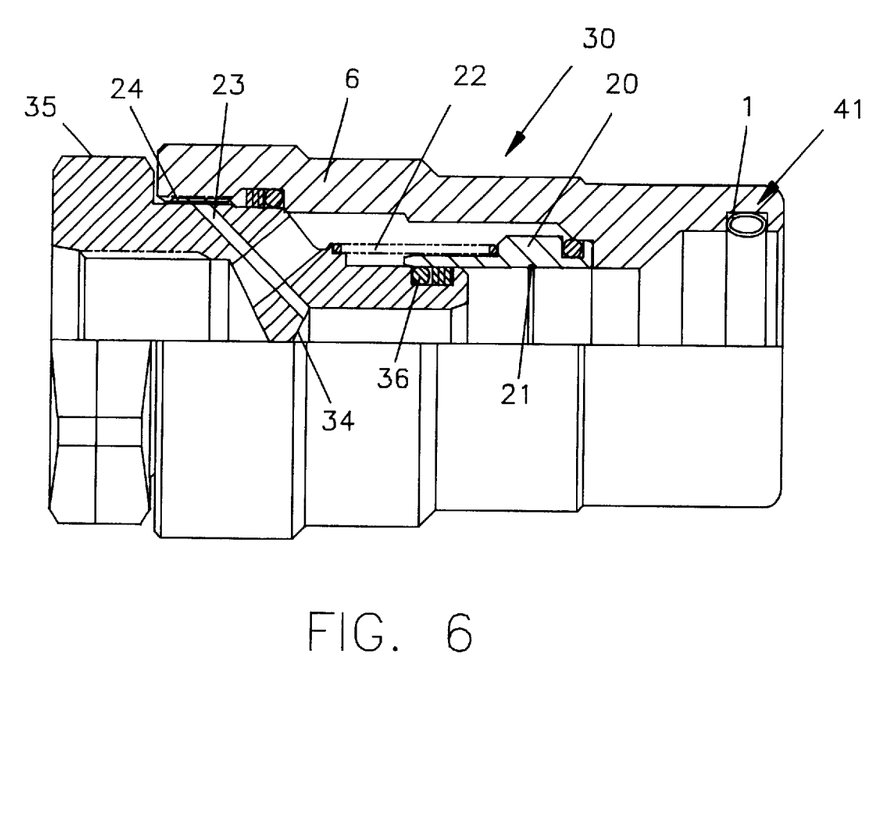

FIG. 6 illustrates the preferred embodiment of the coupler 30.

Figure 7:
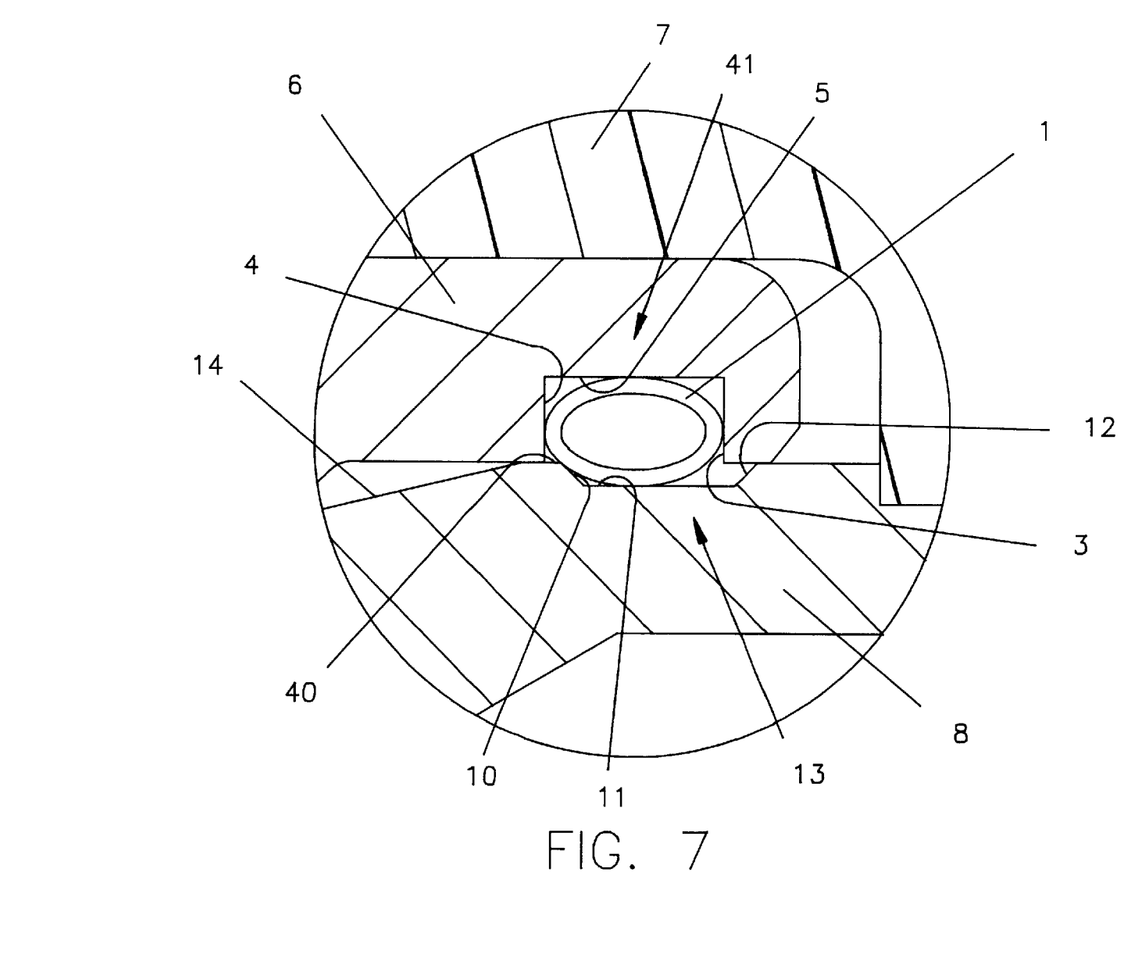
FIG. 7 is an enlarged cross sectional view of the embodiment shown in FIG. 5 illustrating the canted coil spring 1, coupler body 6 and nipple adaptor 8.

FIG. 7 is an enlarged view of the canted coil spring together with the second adaptor 8 and second body 7 of the nipple. Additionally shown in FIG. 7 is the first body 6 of the coupler. FIG. 7 illustrates an inclined surface 14 which enables canted coil spring 1 to be gradually compressed as nipple adaptor 8 is inserted into the coupler. As the nipple adaptor, sometimes referred to herein as the second adaptor, is inserted into the coupler, the canted coil spring 1 is compressed enough to allow the second adaptor 8 of the nipple to slide by the canted coil spring. Reference numeral 40 as shown in FIG. 7 indicates the surface on the second adaptor 8 by which the canted coil spring 1 must pass for the canted coil spring 1 to lock the nipple and coupler together.

Reference numeral 41 is used to illustrate the recess 41 of the coupler body 6. FIG. 7 further illustrates the first shoulder 3, second shoulder 4, and bottom 5 of recess 41 in coupler body 6. Also shown in FIG. 7 is the recess 13 of nipple adaptor 8. Recess 13 of nipple adaptor 8 includes a first beveled surface 10, a bottom surface 11, and a second beveled surface 12. From FIG. 7 it can be seen that the canted coil spring simultaneously engages the first beveled surface 10 of the recess 13 of the adaptor 8, the bottom surface 11 of the recess 13 of the nipple adaptor 8, and the first shoulder 3, second shoulder 4, and bottom 5 of recess 41 of the coupler. The simultaneous engagement of these surfaces secures the nipple and coupler together.

Figure 2:
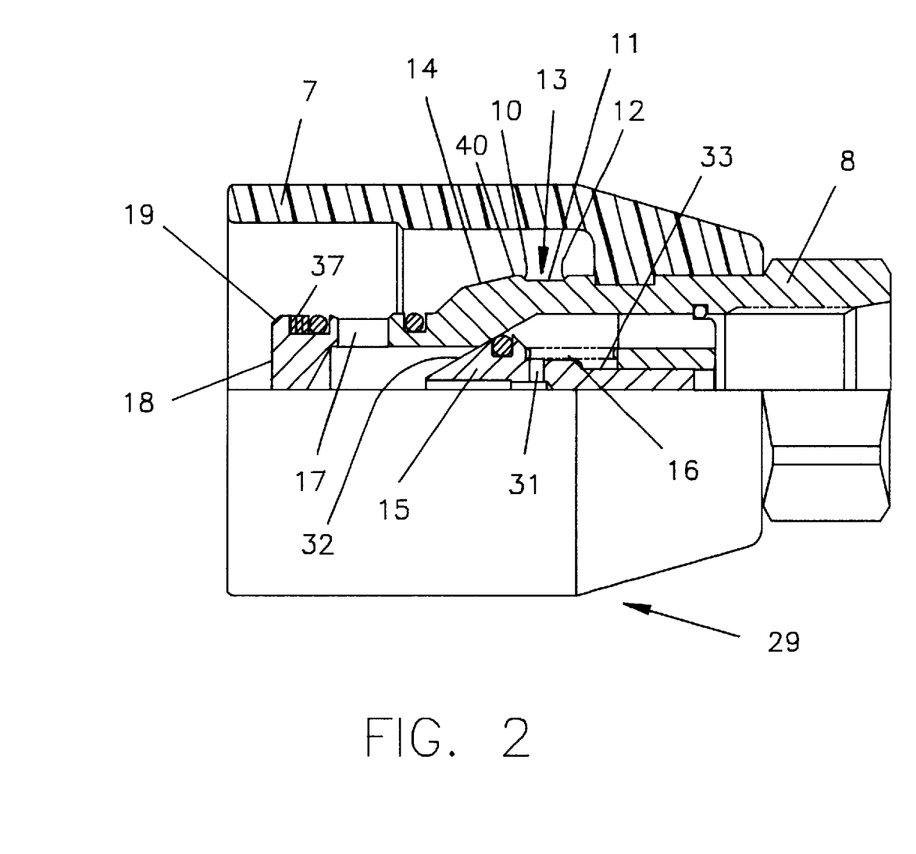

FIG. 2 illustrates the preferred embodiment of the nipple 29. Reference numeral 32 indicates the upstream portion of the check valve 15. Reference numeral 33 illustrates the downstream portion of the check valve.

FIG. 2 illustrates the inclined surface 14 of the second adaptor 8. Inclined surface 14 permits the easy insertion of the nipple into the coupler. The inclined surface 14 permits the gradual compression of canted coil spring 1 as the nipple 29 is inserted into the coupler 6. Second recess 13 of the second adaptor 8 is shown in FIG. 2 along with the first beveled surface 10, the second beveled surface 12 and the bottom surface 11 thereof. FIG. 2 also illustrates the beveled portion 19 of the face 18 of the second adaptor 8 which engages the snap ring 21 located in the coupler valve 20. Second body 7 is made of plastic and is secured to the adaptor 8 when it is forcibly snapped into position during assembly.

Figure 1:
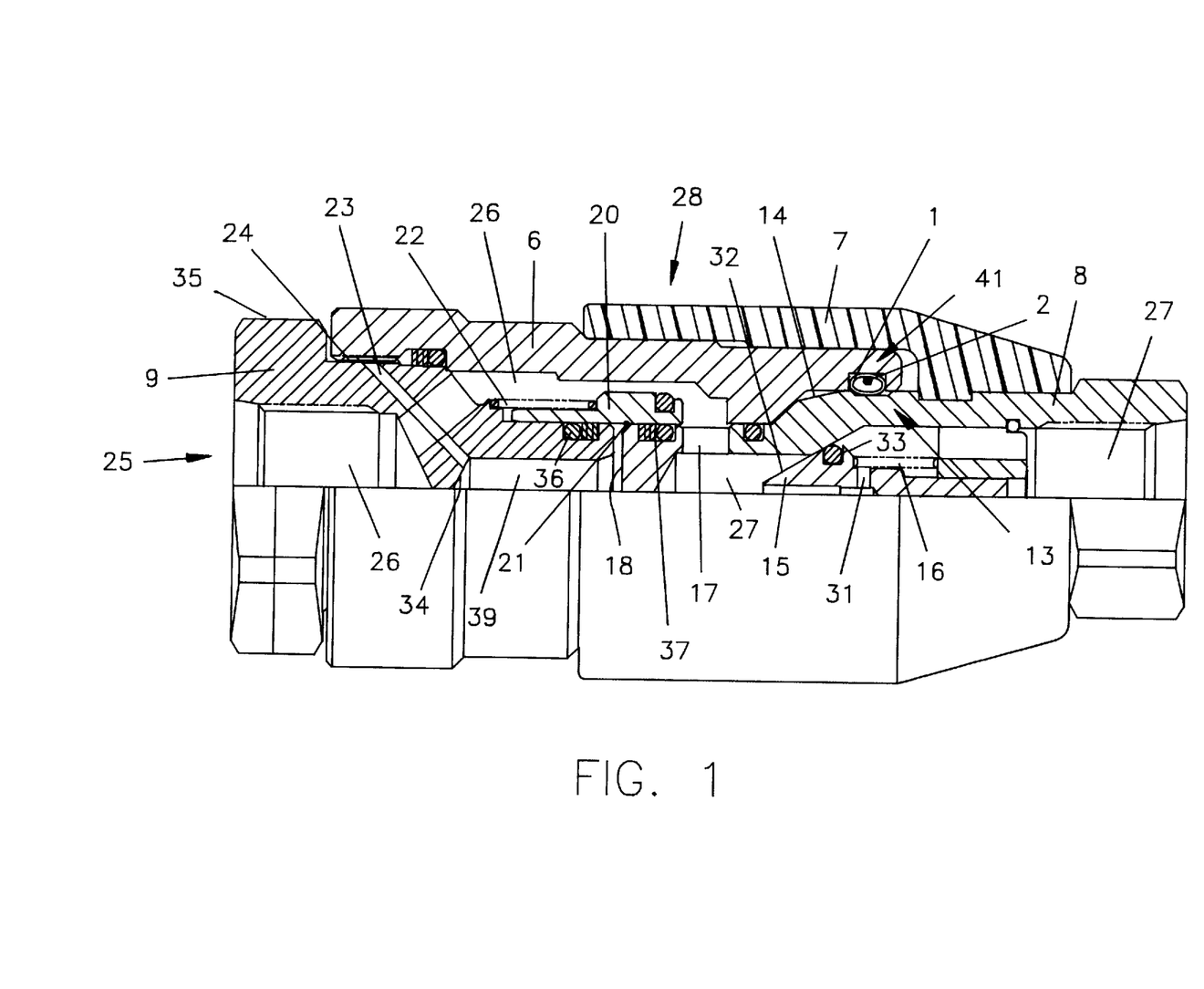
FIG. 1 is a quarter sectional view of the nipple and coupler of the breakaway coupling 28 engaged together. The embodiment illustrated in FIG. 1 includes a canted coil spring 1 together with the snap ring 2 which assists in retaining the canted coil spring 1 in place.

FIG. 1 is another embodiment of the invention and is identical to FIG. 5 with one exception. FIG. 1 illustrates snap ring 2 which assists in positioning canted coil spring 1 in the recess 41 of the coupler body 6.

Figure 3:
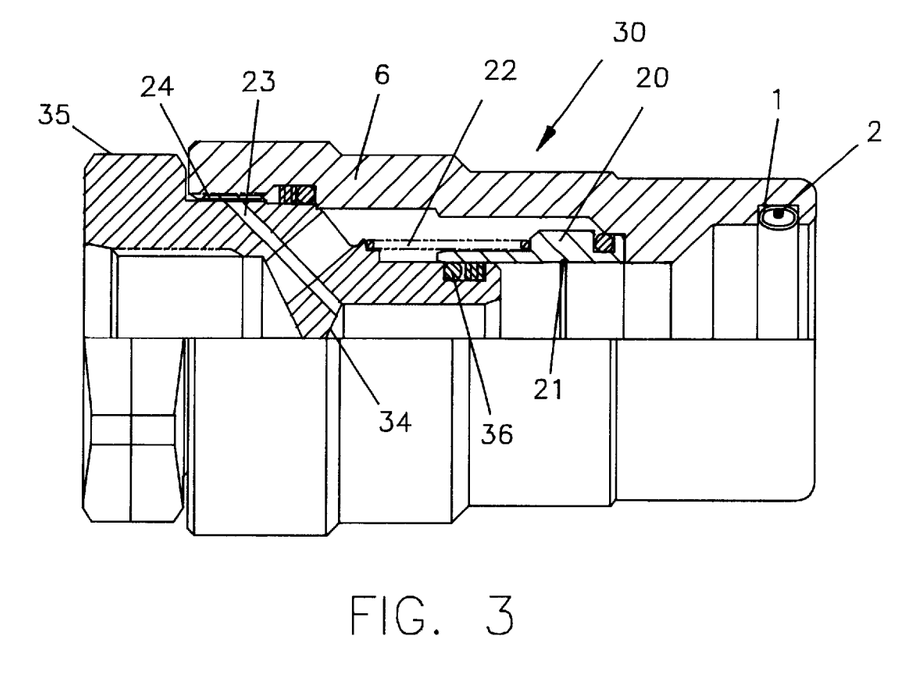

FIG. 3 illustrates the coupler half 30 illustrated in FIG. 1. FIG. 3 is identical to FIG. 6 except snap ring 2 is illustrated within the canted coil spring 1.

Figure 4:
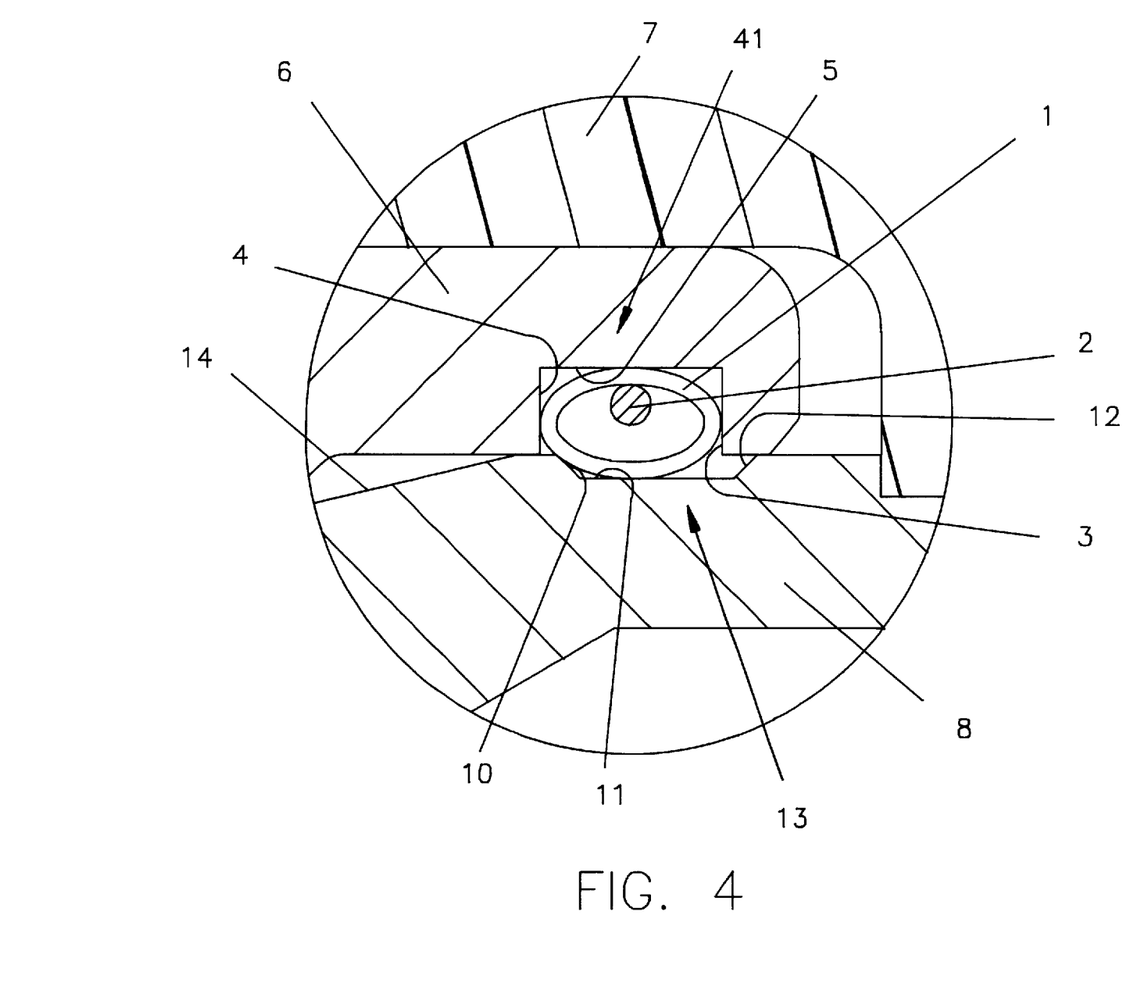
FIG. 4 is an enlarged cross sectional view of the embodiment shown in FIG. 1 illustrating the canted coil spring 1, snap ring 2, coupler body 6 and nipple adaptor 8.

FIG. 4 is identical to FIG. 7 with the exception that: snap ring 2 is illustrated within the canted coil spring 1.

Figure 8:
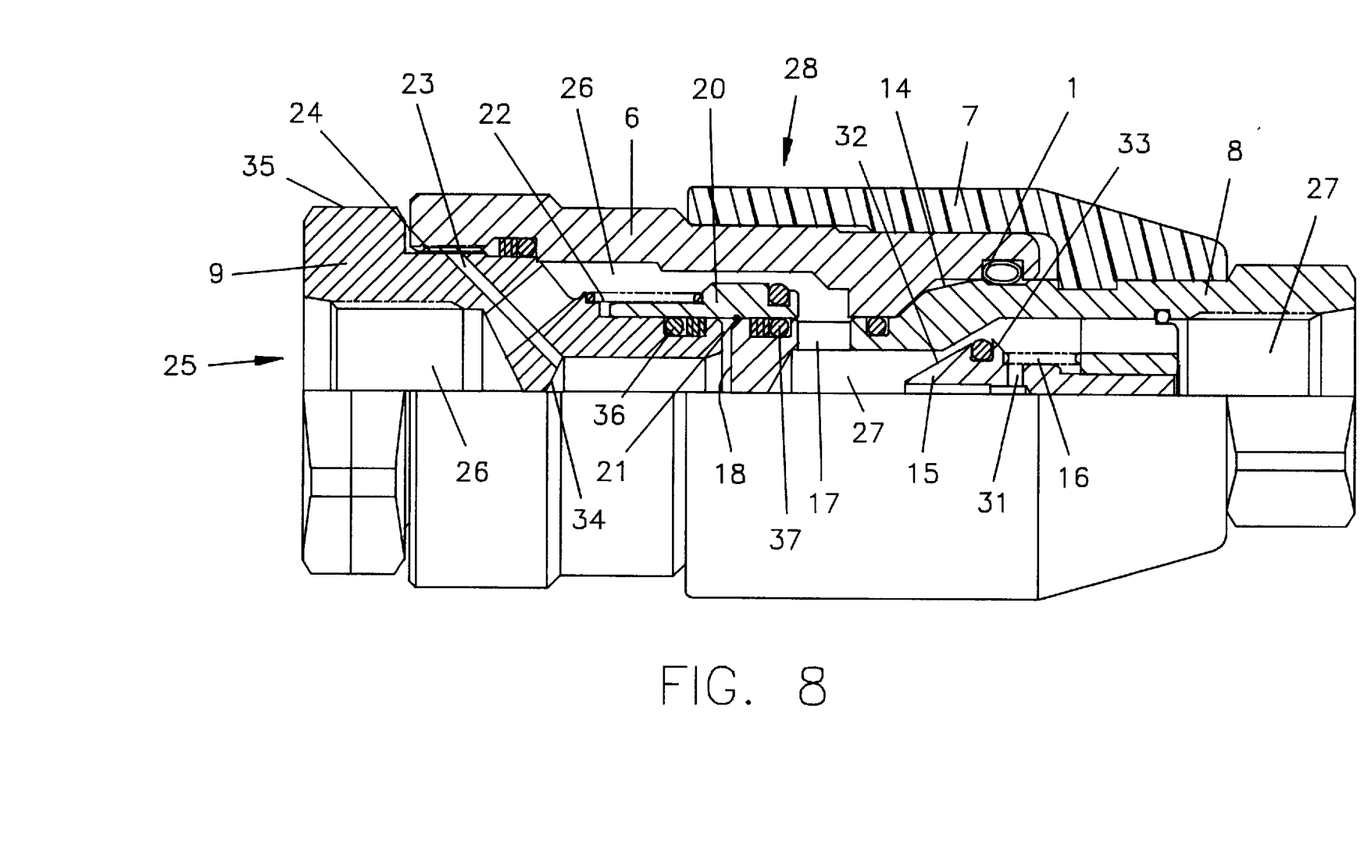

FIG. 8 illustrates check valve 15 in the open position. Check valve 15 is urged to the open position by the application of pressure to the coupler as indicated by reference numeral 25. Check valve 15 compresses spring 16 which allows flow of gas or other fluid from the upstream portion 32 thereof to the downstream portion 33 thereof.

Figure 9:
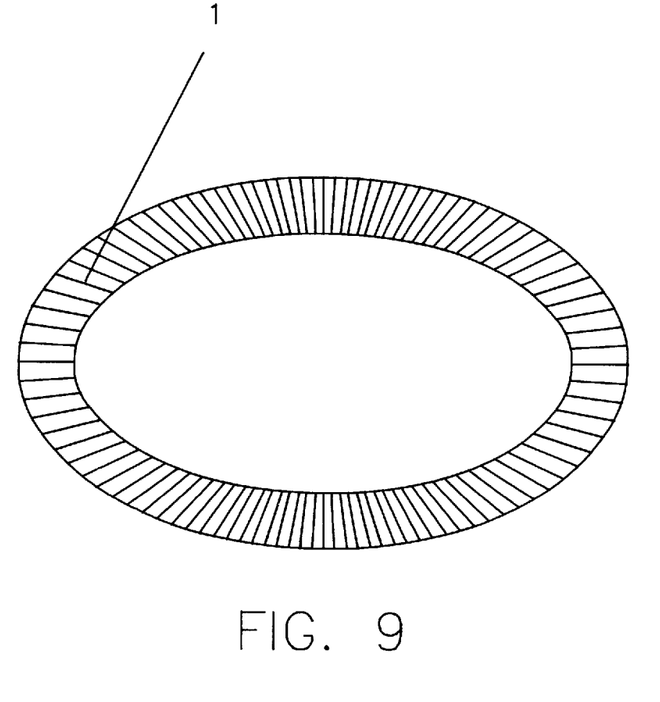
FIG. 9 is an enlarged top view of the canted coil spring employed in the present invention.

FIG. 9 is an enlarged top view of the canted coil spring 1 of the present invention. FIG. 9 illustrates the angled individual coils of the canted coil spring.

Figure 10:
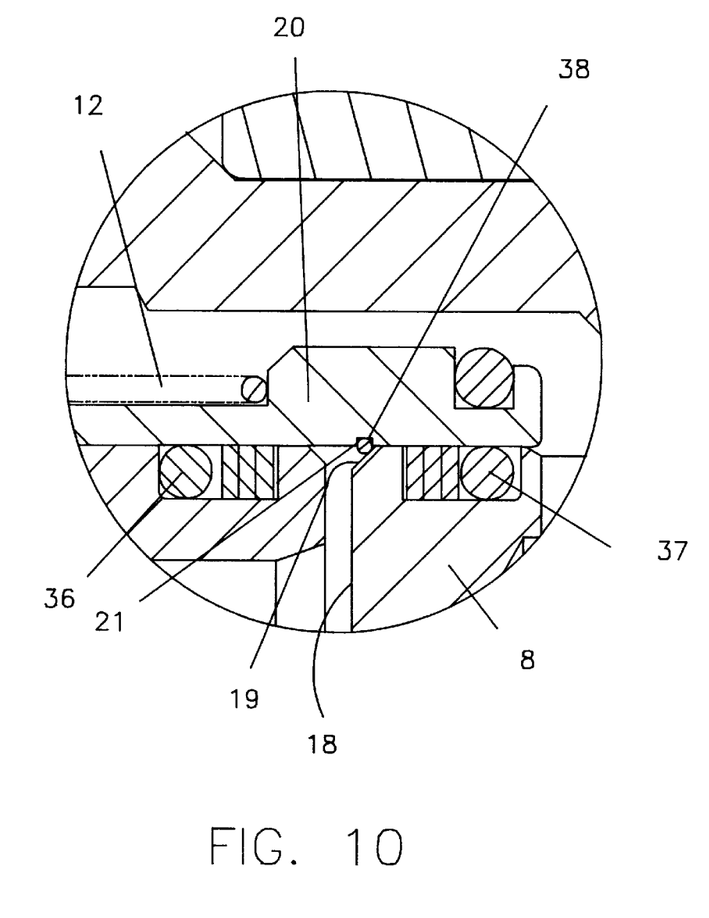
FIG. 10 is an enlarged view illustrating the nipple adaptor 8 engaging snap ring 21 which maintains coupler valve 20 of the coupler in the open position.

FIG. 10 is an enlarged view of the adaptor 8 engaging snap ring 21. Groove 38 in coupler valve 20 is illustrated in FIG. 10 as is the bevelled edge portion 19 of face 18 of second adaptor 8 of the nipple.

Figure 11:
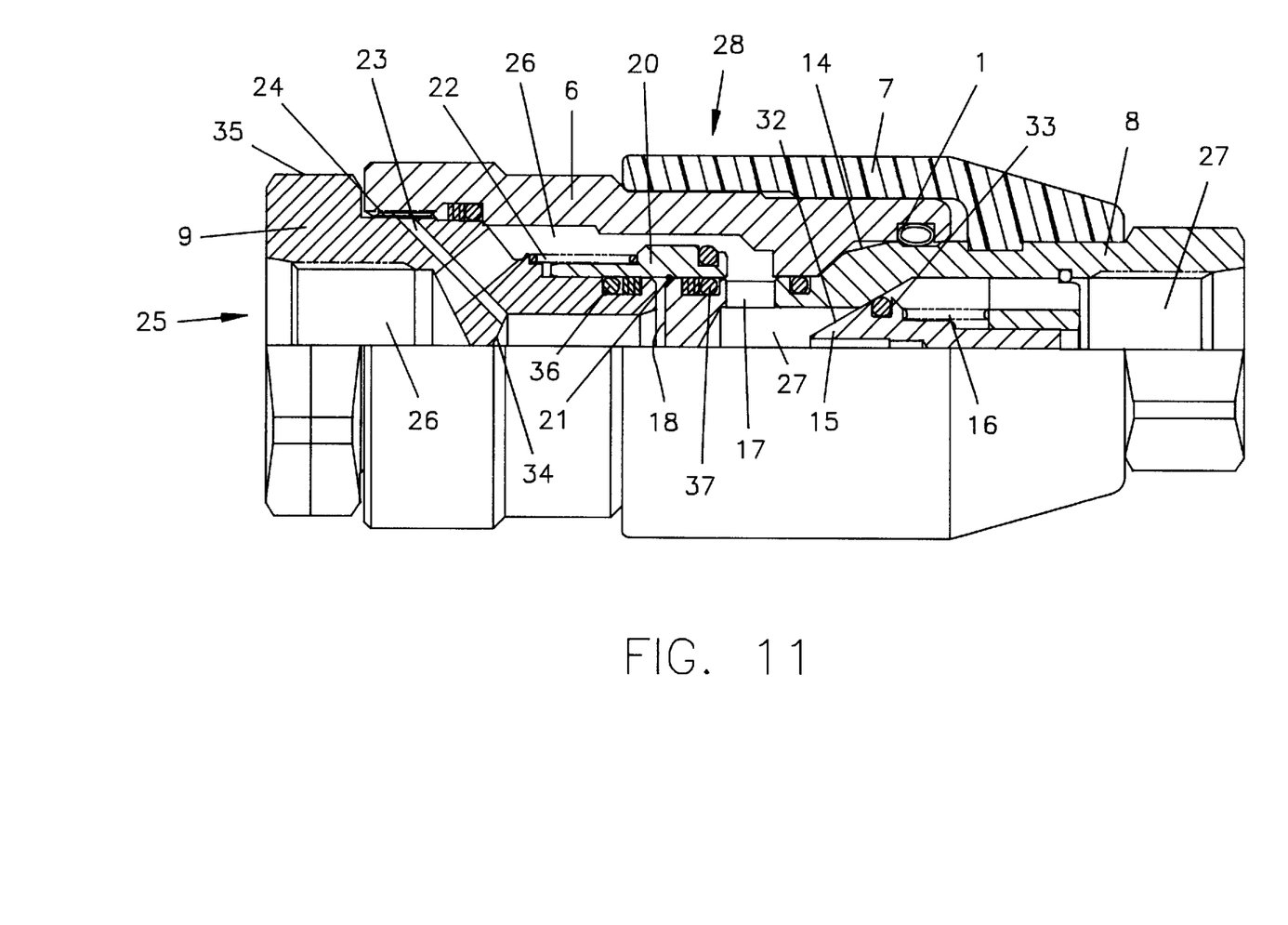
FIG. 11 is similar to FIG. 5 except check valve 15 of the nipple valve does not include bleed port 31.

FIG. 11 is another embodiment of the invention. FIG. 11 illustrates check valve 15 without any bleed ports. This embodiment will function provided the downstream nozzle (not shown) includes means to vent pressure from the nozzle prior to disconnection from the vehicle.

Figure 12:
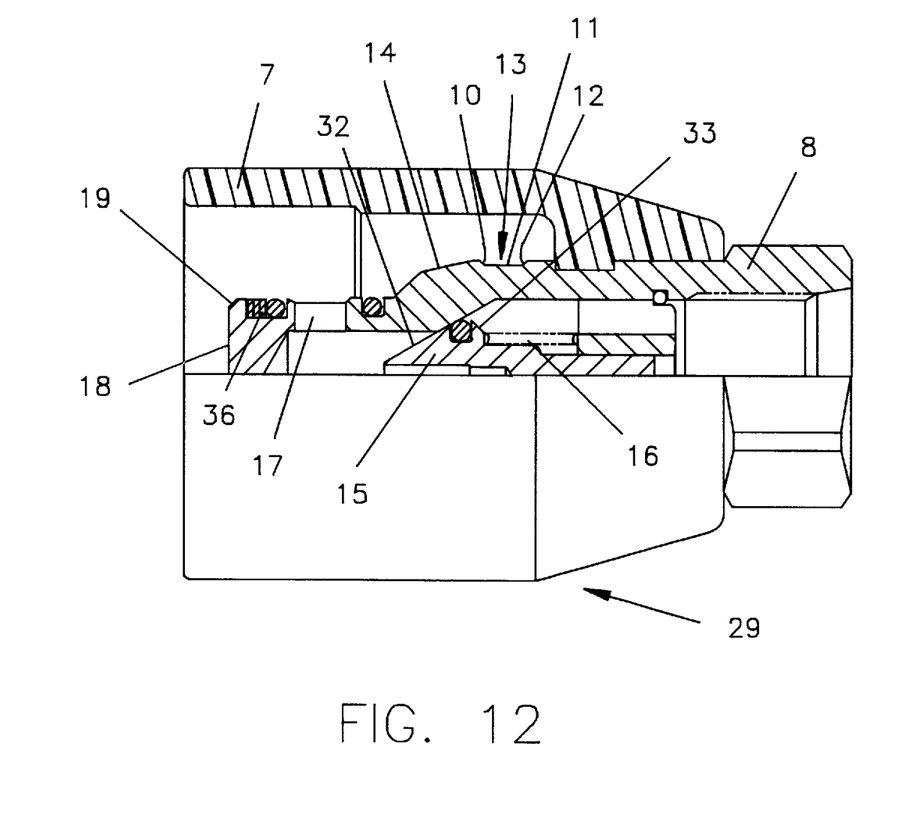
FIG. 12 is a quarter sectional view of the coupler 30 of the breakaway coupling similar to FIG. 2 except the check valve 15 of the nipple does not include bleed port 31.

FIG. 12 illustrates the nipple of the embodiment illustrated in FIG. 11. Namely, there are not any bleed back ports in check valve 15 illustrated in FIG. 12.

The invention has been described in detail with particular emphasis on the preferred embodiments thereof, but it should be understood that variations and modifications within the spirit and scope of the invention may occur to those skilled in the art to which the invention pertains.

What is claimed is:

1. A breakaway coupling comprising: a coupler and a nipple engaged together; said coupler includes a coupler body and a coupler valve; said nipple includes an adaptor, a nipple body, and a check valve; said coupler includes a groove and a snap ring disposed in said groove; said coupler body includes a first recess therein; said adaptor of said nipple includes a second recess; a canted coil spring; said canted coil spring is disposed in said first recess of said coupler body and said second recess of said adaptor of said nipple preventing disengagement of said coupler and said nipple; and, said adaptor of said nipple engages said snap ring disposed in said coupler valve maintaining said coupler valve in said open position and said check valve being in a closed position when said coupler and said nipple are engaged together.

2. A breakaway coupling as claimed in claim 1 wherein: said adaptor of said nipple includes a face having a beveled edge portion; and, said beveled edge portion of said face of said nipple engages said snap ring disposed in said groove of said coupler valve.

3. A breakaway coupling as claimed in claim 2 wherein said body of said nipple is plastic.

4. A breakaway coupling comprising a coupler and a nipple engaged together; said coupler includes a first adaptor, a coupler valve, and a coupler body; said nipple includes a second adaptor, a check valve and a nipple body; said coupler body of said coupler includes a first recess and said second adaptor of said nipple includes a second recess and a face; said face of said second adaptor includes a beveled edge portion, said coupler valve includes a groove; a snap ring disposed in said groove of said coupler valve; said beveled edge portion of said face of said second adaptor engages said snap ring of said coupler valve and maintains said coupler valve in an open position; and, a canted coil spring disposed in said first recess of said coupler body and said second recess of said second adaptor preventing separation of said nipple and said coupler.

5. A breakaway coupling as claimed in claim 4 wherein said check valve of said nipple includes an upstream portion, a downstream portion and a bleed back passageway connecting said upstream and downstream portions.

6. A breakaway coupling as claimed in claim 5 which further comprises said coupler body being affixed to said first adaptor of said coupler; said first adaptor of said coupler includes an interior portion an and exterior portion; and, a vent passageway in said first adaptor extending from said interior portion to the exterior portion of said first adaptor.

7. A breakaway coupling as claimed in claim 6 wherein said coupler body and said first adaptor are threadably interconnected.

8. A breakaway coupling as claimed in claim 4 which includes a first gas passageway through said coupler which communicates with a port in said nipple, said port in said nipple communicates with second gas passageway through said nipple, and, said communication of said passageways and port being pressure balanced.

\* \* \* \* \*

UNITED STATES PATENT AND TRADEMARK OFFICE
CERTIFICATE OF CORRECTION

PATENT NO. : 5,881,769
DATED : March 16, 1999
INVENTOR(S) : Douglas F. Hopson

It is certified that error appears in the above-identified patent and that said Letters Patent is hereby corrected as shown below:

Col. 5, line 17, after "that", delete ": ".

Claim 6, Col. 6, line 39, after "portion", delete "an".

Claim 6, Col. 6, line 39, after "and", insert -- an --.

Signed and Sealed this

Third Day of August, 1999

Attest:

Q. TODD DICKINSON

Attesting Officer     Acting Commissioner of Patents and Trademarks